United States Patent Office 2,875,118
Patented Feb. 24, 1959

2,875,118
METHOD AND COMPOSITION FOR THE TREATMENT OF SOIL

George O. Turner, Long Beach, Calif., assignor to The Dow Chemical Company, Midland, Mich., a corporation of Delaware No Drawing. Application October 7, 1953
Serial No. 384,787

9 Claims. (Cl. 167—22)

The present invention is concerned with the treatment of soil or growth media and is particularly directed to a method and composition for the control of soil-inhabiting invertebrates which attack the underground parts of plants and improving the growth characteristics of plants.

It is an object of the present invention to provide an improved method for the fumigation and disinfection of soil infested with nematodes, fungi, and other invertebrates which attack plant roots. An additional object is to provide a method for improving the growth characteristics of plants. A further object is to provide a novel soil composition. Another object is the provision of a novel composition adapted to be employed in the new method of fumigation. Other objects will become apparent from the following specification and claims.

According to the present invention it has been discovered that soil-inhabiting invertebrates which attack the underground parts of plants may be controlled by applying to and mixing with soil or other growth media a compound having the formula I—$C_nH_{2n}$—Cl wherein $n$ represents one of the integers from 2 to 4, inclusive. It has further been discovered that such treatment or impregnation accomplishes changes in the soil which stimulate the growth and improve the growth characteristics of crops subsequently planted therein. The soil treating compounds are relatively colorless, inflammable viscous liquids somewhat soluble in many organic solvents and of low solubility in water, and are adapted to be conveniently and readily distributed in soil. Further, when so employed the compounds accomplish a rapid control of invertebrate organisms and induce soil changes which improve the growth characteristics of crops later raised in the treated soil. It is among the advantages of the present invention that the compounds permeate growth media for a distance of several inches from the point of application depending upon temperature, moisture content, compactness and physical consistency of the media. It is a further advantage that the compounds are sufficiently persistent to accomplish the desired effect upon the soil-dwelling organisms or to achieve the changes in the soil which accomplish improved growth characteristics but dissipate in a reasonable period of time.

The expression "soil" is employed in its broadest sense to be inclusive of all conventional "soils," as defined in Webster's New International Dictionary, Second Edition, Unabridged, published in 1937 by G. and C. Merriam Company, Springfield, Massachusetts. Thus, the term refers to any substance or medium in which vegetative organisms may take root and grow, and is intended to include not only earth, but also compost, manure, muck, sand and the like, adapted to support plant growth.

The distribution of an effective dosage of the compounds in soil is essential for the practice of the invention. Where nematodes are to be controlled, this amounts to a parasiticidal concentration. Where plant growth response is concerned, somewhat lower concentrations are sometimes operable. In general, good results are obtained when the compounds are distributed through the soil in the amount of from about 12 to 200 parts or more by weight per million parts by weight of the soil. In field applications, the compounds may be distributed in the soil at a dosage of from about 10 to 200 pounds or more per acre, and through such a cross-section of the soil as to provide for the presence therein of an effective concentration of the treating agent. In such applications, it is desirable that the compounds be distributed to a depth of at least 2 inches. When the treatment is carried out by injection or drilling technique it is preferred that the maximum distance between deposits be not in excess of from about 8 to about 12 inches. In the row treatment of existing vegetation, the products may be employed in accordance with known side-dressing techniques.

The method of the present invention may be carried out by distributing the unmodified compounds through the growth media as by impregnation or fumigation. However, the present method also embraces the employment of a liquid or dust composition containing the toxicants. In such usage, the compounds may be modified with one or more of a plurality of additaments including solvents or other liquid carriers, dispersing and emulsifying agents and finely divided inert solids. Depending upon the concentration of toxicant, such augmented compositions are adapted to be distributed in the soil, or employed as concentrates and subsequently diluted with additional inert carrier to produce the ultimate treating compositions. The required amount of the compounds in the soil conveniently may be supplied per acre treated, in from 10 to 13,000 gallons or more of the liquid carrier or in from about 100 to 1,000 pounds of the solid carrier.

The exact concentration of the compounds to be employed in compositions for the treatment of soil is not critical. The concentration of toxicant in liquid compositions employed to supply the desired dosage generally is from about 0.1 to 60 percent by weight or higher. In dusts, the concentration of toxicant may be from about 6 to 20 percent by weight. In compositions to be employed as concentrates, the toxicant may be present in a concentration of from about 5 to 95 percent by weight.

Liquid compositions containing the desired amount of the compounds may be prepared by dissolving the toxicants in an organic liquid such as acetone, methylene chloride, chlorobenzene and petroleum distillates, or by dispersing the toxicants in water with the aid of a suitable dispersing and emulsifying agent. The preferred organic solvent carriers are those which are adapted to accomplish the penetration and impregnation of the soil with the compounds and are of such volatility that they evaporate from the soil and leave little permanent residue therein.

The aqueous compositions to be employed in the present method may contain one or more water-immiscible solvents for the compounds. In such compositions, the carrier comprises an aqueous emulsion, i. e. a mixture of water-immiscible solvent, emulsifying agent and water. The choice of dispersing and emulsifying agent and the amount thereof employed is dictated by the nature of the composition type and by the ability of the agent to facilitate the dispersion of the compounds in the aqueous carrier to produce the desired fumigant compositions. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

A preferred embodiment of the invention consists of a petroleum distillate solution of the compounds. The petroleum distillates to be employed in such embodiment are carefully cut portions boiling almost entirely under 400° F. at atmospheric pressure and having a flash point above about 80° F. These fumigant compositions are characterized by having excellent penetrating properties and by being of low fire hazard to the shipper and user.

In the preparation of dust compositions, the compounds are dispersed in and on a finely divided material such as pyrophyllite, attapulgite, chalk, talc, fuller's earth or bentonite. In such operations, the finely divided carrier is mixed or wet with the toxicant compounds or a volatile organic solvent solution thereof.

A further embodiment of the present invention is a novel composition comprising soil in admixture with an effective concentration of the toxicant compounds.

When operating in accordance with the present invention, the soil or growth media may be impregnated with the compounds or a composition containing such toxicants, in any convenient fashion, e. g. by simple mixing with the growth media, by employing a liquid carrier to accomplish the penetration and impregnation, or by injection or drilling techniques whereby the toxicant is deposited beneath the surface of the soil. In general, it is desirable that such distribution be carried out at a soil temperature of 45° F. or higher since the effectiveness of the compounds may be somewhat reduced at lower temperatures.

In a preferred embodiment, the method of the present invention is carried out in soil having a moisture content of from about 50 to 100 percent of the moisture equivalent of the soil. When operating under such soil conditions, maximum controls of invertebrate organisms are obtained. Thompson, L. M., in "Soils and Soil Fertility," McGraw-Hill Book Company, Inc. (1952), defines the moisture equivalent of a soil as equal to the percentage of water retained by wet soil after being centrifuged at 1000 times gravity. This equivalent is about the same as the so-called field capacity which may be defined as the moisture condition of the soil when downward movement of water into the soil has virtually ceased. The moisture equivalent or field capacity is dependent primarily upon the percentage of organic matter in the soil, the size of the soil particles and the porosity of the soil.

In a further method, the distribution may be accomplished by introducing the toxicants in the water employed to irrigate the soil. In this method, the amount of water may be varied in accordance with the moisture content and the moisture equivalent or field capacity of the soil in order to obtain the desired depth of distribution of the toxicant at a soil moisture content equal to the moisture equivalent. Following the distribution of the compounds, it is preferred that the planting operation not be carried out for a period of at least several days. When following such a practice, no adverse effect upon germination of seeds or growth of the transplants is observed. Further, where minimum dosages are employed as, for example, in side-dressing operations, existing mature vegetation of species resistant to the compounds are not unfavorably affected by the concentrations of the treating composition temporarily present in the soil.

The following examples illustrate the invention but are not to be construed as limiting the same:

Example 1

1-chloro-2-iodo-ethane (boiling at 140° C.) was dissolved in acetone to produce a fumigant composition containing 500 grams of the ethane compound per liter of ultimate mixture. This composition was employed for the treatment of a seed bed containing a sandy loam soil heavily infested with root-knot nematodes. At the time of treatment the soil had a moisture content of about 10 percent. This moisture content is about 80 percent of the moisture equivalent or field capacity of the soil. The distribution was accomplished by injecting the fumigant solution into the soil in rows 12 inches apart, the injections being made at 4-inch intervals and at a depth of about 6 inches below the soil surface. The amount of fumigant employed was sufficient to supply about 50 pounds of the 1-chloro-2-iodoethane per acre. The latter dosage corresponds to a concentration of about 17 parts by weight of 1-chloro-2-iodoethane per million parts by weight of soil. Following the application, the average soil temperature remained at about 62° F. for the period of the determination.

Ten days after treatment, the soil was seeded with tomatoes, the seeded soil being that positioned approximately 6 inches from the loci of treatment. Untreated check plots were also planted with tomato seeds. During the growing period there was observed no adverse effect upon the germination and growth of seedlings attributable to the presence of residual fumigant. About 5 weeks after seeding, the plants were lifted from the soil, the roots washed and the latter examined for gall formation attributable to nematode attack. The examination of the plants indicated a 100 percent control of nematodes in the treated soil, with heavy infestation in the check plots.

Example 2

1-chloro-3-iodo-propane (boiling at 170°–172° C.) and 1-chloro-4-iodo-butane (boiling at 93°–94.5° C. at 17 millimeters' pressure) were dissolved in acetone to prepare fumigant compositions containing 500 grams of toxicant per liter of ultimate mixture. These compositions and the 1-chloro-2-iodo-ethane composition of Example 1 were separately employed for the treatment of seed beds containing a sandy loam soil heavily infested with root-knot nematodes. In the treating operations, the distribution was accomplished as described in Example 1 to provide various concentrations of toxicant in the treated soil. At the time of treatment the soil in the seed beds had a moisture content of about 10 percent, the latter being about 80 percent of the moisture equivalent of the soil. Following the application, the average soil temperature remained at about 62° F. for the period of the determination.

Ten days after the treatments, the seed beds were seeded with tomatoes, the seeded soil in such beds being that positioned approximately 6 inches from the loci of treatment. Untreated check plots were also planted with tomato seeds. During the growing period there was observed no adverse effect upon the germination and growth of seedlings attributable to the presence of residual fumigant. About 5 weeks after seeding, the plants were lifted from the soil in the seed beds, the roots carefully washed and the latter examined for gall formation attributable to nematode attack. The dosages of toxicant employed and percent control of nematodes obtained are set forth in the following table:

| Treating Compound | Pounds of Treating Compound Per Acre | Concentration of Treating Compound in Parts by Weight per Million Parts by Weight of Soil | Percent Control of Nematodes |
| --- | --- | --- | --- |
| 1-chloro-2-iodoethane | 25 | 8.6 | 93 |
| 1-chloro-3-iodopropane | 100 | 34.0 | 100 |
| 1-chloro-4-iodobutane | 50 | 17.0 | 100 |

In the check plots, the plants were found to be dwarfed and their roots covered with galls attributable to nematode attack.

Example 3

An acetone solution containing 50 grams of 1-chloro-2-iodo-ethane per liter of solution was employed for the treatment of a sandy loam soil which was heavily infested with root-knot nematodes. In such operations, the soil was placed in a sealable container and thereafter treated with the fumigant composition at a dosage of 50 pounds per acre-foot. In the treating operation, the distribution was accomplished by injection to give a concentration of about 12 parts by weight of the ethane compound per million parts by weight of soil. The containers of treated soil were then sealed and set aside at a temperature of about 25° C.

After one week, the containers were unsealed, and the treated soil allowed to aerate for about one week and thereafter planted with tomato seeds. Untreated check plots were also planted with tomato seeds. During the following growth period there was observed no adverse effect upon germination and growth of seedlings attributable to the presence of residual fumigant. About five weeks after planting, the plants were lifted from the soil, and the roots washed and examined for evidence of nematode attack. The examination of the plants indicated that a 100 percent control of nematodes had been obtained in the treated soil with heavy infestation in the check plots.

*Example 4*

1-chloro-3-iodo-propane and 1-chloro-4-iodo-butane were dissolved in acetone to prepare fumigant compositions containing 50 grams of toxicant per liter of ultimate mixture. These compositions were employed as described in Example 3 for the treatment of sandy loam soil heavily infested with root-knot nematodes. The treating and subsequent planting operations were all as described in said example, the compositions being employed at a dosage of 50 pounds of toxicant per acre-foot. Following the planting operations, there was observed no adverse effect upon the germination and growth of seedlings attributable to the presence of residual fumigant.

About five weeks after planting, the plants were lifted from the soil and the roots washed and examined for evidence of nematode attack. The examination of the plants indicated that a 100 percent and 96 percent control of nematodes had been obtained in the soil treated with 1-chloro-3-iodo-propane and 1-chloro-4-iodo-butane, respectively. In contrast, the roots of the plants from the untreated soil were dwarfed and severely affected with galls attributable to nematode attack.

*Example 5*

45 parts by weight of 1-chloro-2-iodo-ethane, 50 parts by weight of chlorobenzene and 5 parts of a dimeric alkylated aryl polyether alcohol (Triton X-155) are mechanically mixed together to prepare a fumigant composition in the form of an emulsifiable liquid. In a similar manner, 90 parts by weight of 1-chloro-4-iodo-butane and 10 parts by weight of Triton X-155 are mixed together to prepare a concentrate composition in the form of a water-dispersible liquid. These compositions are adapted to be dispersed in water to prepare aqueous compositions which have very desirable wetting and penetrating properties. The latter compositions may be employed to treat soil and distribute the alkane compounds therein in parasiticidal concentrations.

*Example 6*

A fumigant composition, having a flash point greater than 100° F., is prepared by mixing together 20 percent by volume of 1-chloro-2-iodo-ethane and 80 percent of a petroleum fraction commonly known as Stoddard solvent. The latter solvent has a boiling range of from 325° to 400° F. and a flash point of about 116° F. This composition is employed for the treatment of one-half of a field containing a sandy loam soil. The treatment is carried out by drilling technique whereby the fumigant mixture is introduced at a depth of about 6 inches and in rows spaced about 8 inches apart. The amount of composition employed is sufficient to supply 25 pounds of 1-chloro-2-iodo-ethane per acre. At the time of treatment, the soil is saturated with water approximately at the field capacity.

Ten days after treatment, the entire field is seeded to carrots. Toward the end of the growing season, the foliage and tops of the carrot plants in the treated portion of the field are observed to be more lush and bountiful than those in the untreated part. At harvest, the yield of carrots taken from the treated soil is found substantially greater than that from the untreated soil by a factor of several percent.

*Example 7*

90 parts by weight of 1-chloro-2-iodo-ethane is intimately mixed with 12 parts by weight of Triton X-155 and the resulting composition thereafter dispersed in water to prepare a composition containing about 100 pounds of the ethane compound per 200 gallons of ultimate mixture. The latter composition, while under agitation, is metered into irrigation water at the pump outlet at the rate of 2 gallons per 100 gallons of the irrigation water. The water is in a state of turbulent flow as it comes from the pump which provides for thorough mixing of the toxicant therein. About 0.5 inch of irrigation water is applied to land, which is heavily infested with root-knot nematodes to accomplish the wetting of the soil to about a 5-inch depth. One week after treatment, the soil is planted with tomato seeds. Four weeks after the seeding, the roots of the resulting stand of tomato plants are examined and found substantially free of galls attributable to nematode attack.

I claim:

1. A method for destroying nematodes in soil and improving the ability of soil to support plant growth which comprises impregnating nematode infested soil with a composition consisting as its essential active agent of a compound selected from the group consisting of 1-chloro-2-iodo-ethane, 1-chloro-3-iodo-propane and 1-chloro-4-iodo-butane.

2. A method for destroying nematodes in soil and improving the ability of soil to support plant growth which comprises impregnating nematode infested soil with a composition consisting as its essential active agent of a compound selected from the group consisting of 1-chloro-2-iodo-ethane, 1-chloro-3-iodo-propane and 1-chloro-4-iodo-butane, the impregnation being carried out in the soil so as to provide at least 12 parts by weight of active agent per million parts by weight of soil.

3. A method for destroying nematodes in soil and improving the ability of soil to support plant growth which comprises impregnating nematode infested soil with a composition consisting as its essential active agent a compound selected from the group consisting of 1-chloro-2-iodo-ethane, 1-chloro-3-iodo-propane and 1-chloro-4-iodo-butane, the impregnation being carried out at a substantially uniform dosage of at least 10 pounds of active agent per acre and through such a cross section of the soil as to provide for the presence therein of a concentration of active agent of at least 12 parts by weight per million parts by weight of soil.

4. A method claimed in claim 2 wherein the active agent is employed in admixture with a soil-fumigating adjuvant as a carrier therefor.

5. A method claimed in claim 3 wherein the soil at the time of treatment has a moisture content of from 50 to 100 percent of the moisture equivalent of said soil.

6. A method claimed in claim 3 wherein the soil is impregnated with 1-chloro-2-iodo-ethane.

7. A method claimed in claim 3 wherein the soil is impregnated with 1-chloro-4-iodo-butane.

8. A concentrate composition consisting as its essential active agent of a compound selected from the group consisting of 1-chloro-2-iodo-ethane, 1-chloro-3-iodo-propane and 1-chloro-4-iodo-butane in admixture with an emulsifying and dispersing agent, the active agent being present in the composition in the amount of at least 5 percent by weight.

9. A composition consisting as its essential active agent of a member of the group consisting of 1-chloro-2-iodo-ethane, 1-chloro-3-iodo-propane and 1-chloro-4-iodo-butane in admixture with a liquid solution of an emulsifying and dispersing agent, the active agent being present in the amount of at least 0.1 percent by weight.

References Cited in the file of this patent

UNITED STATES PATENTS

| | | |
|---|---|---|
| 2,191,301 | Smith | Feb. 20, 1940 |
| 2,614,919 | Warren et al. | Oct. 21, 1952 |

FOREIGN PATENTS

| | | |
|---|---|---|
| 956,156 | France | July 18, 1949 |
| 124,387 | Australia | June 12, 1947 |
| 920,161 | France | Jan. 2, 1947 |

OTHER REFERENCES

Frear: "Catalogue of Insecticides and Fungicides," pub. by Chronica Botanico Co., Waltham, Mass., 1947, vol. 1, pp. 160, 161, 163 and 165.

Roorke et al.: U. S. Dept. of Agri., Tech. Bul. No. 162, March 1929, pp. 1–52 (pp. 3–11 pert.).

Chem. Abstracts, vol. 41, col. 2995(i), 1947, Midzushima et al.

Chem. Abstracts, vol. 42, col. 6316(e), 1948, Ahmad et al.

Chem. Abstracts, vol. 46, col. 5527(i), Howton et al.